Figure 1:
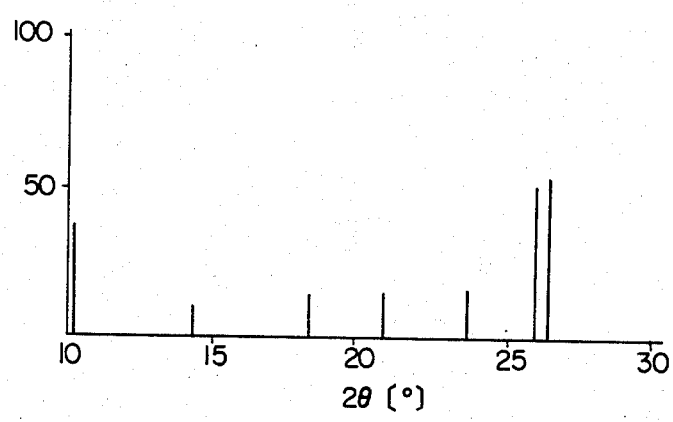

United States Patent [19]

Hashimoto et al.

[11] Patent Number: 4,536,569
[45] Date of Patent: Aug. 20, 1985

[54] 2-CYANO-4-NITRO-6-CHLOROPHENYLAZO 3-ACETYL-OR PROPIONYLAMINO-N,N-DI-N-PENTYL OR HEXYLANILINES

[75] Inventors: Kiyoyasu Hashimoto, Ibaraki; Kenji Yoshinaga; Yoshio Mori, both of Toyonaka; Junzaburo Seino, Kishiwada; Hirohito Kenmochi, Takatsuki; Katsunobu Sato, Toyonaka, all of Japan

[73] Assignee: Sumitomo Chemical Company, Limited, Osaka, Japan

[21] Appl. No.: 247,869

[22] Filed: Mar. 26, 1981

Related U.S. Application Data

[63] Continuation of Ser. No. 58,158, Jul. 17, 1979, abandoned.

[30] Foreign Application Priority Data

Jul. 21, 1978 [JP] Japan ............................. 53-89716
Jul. 28, 1978 [JP] Japan ............................. 53-92879
Sep. 22, 1978 [JP] Japan ............................. 53-117108
Oct. 26, 1978 [JP] Japan ............................. 53-132209
May 10, 1979 [JP] Japan ............................. 54-57878

[51] Int. Cl.³ ............................. C09B 29/01; C09B 29/12; C09B 46/00; D06P 1/18
[52] U.S. Cl. ............................. 534/575; 534/573; 534/643; 534/850; 534/855; 534/887
[58] Field of Search ............... 260/207, 208; 534/575, 534/850

[56] References Cited

U.S. PATENT DOCUMENTS 3,956,270 5/1976 Von Rombach et al. ......... 260/205

FOREIGN PATENT DOCUMENTS 41-6910 4/1966 Japan ............................. 260/207.1
51-16554 5/1976 Japan ............................. 260/207.1
1489016 10/1977 United Kingdom ............. 260/207.1

Primary Examiner—Floyd D. Higel
Attorney, Agent, or Firm—Stevens, Davis, Miller & Mosher

[57] ABSTRACT

A compound of the formula,

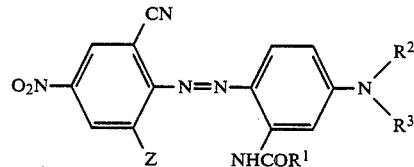

wherein $R^1$ is methyl or ethyl, $R^2$ and $R^3$ are each $C_5$— or $C_6$—alkyl, and Z is chlorine for use as a blue disperse dye of hydrophobic fibers, either alone or as a mixed dye in combination with anthraquinone; the compound combines low cost relative to anthraquinone with superior stability in the dye bath and excellent dyeability; mixed dyes retain anthraquinone-imparted brilliance of color, have good color fastness, dyeability and reproducibility characteristics, and maintain low cost.

2 Claims, 3 Drawing Figures

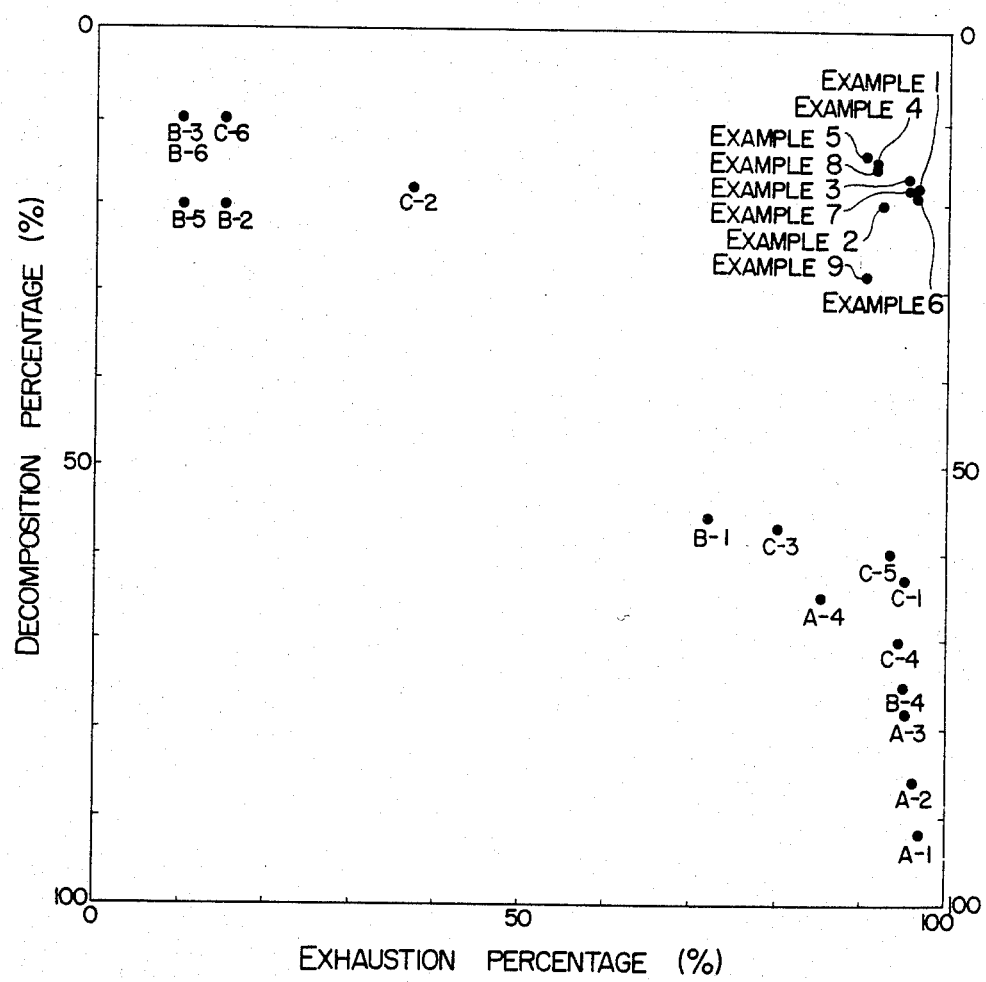

2-CYANO-4-NITRO-6-CHLOROPHENYLAZO 3-ACETYL-OR PROPIONYLAMINO-N,N-DI-N-PENTYL OR HEXYLANILINES

This is a continuation of application Ser. No. 58,158 filed July 17, 1979 now abandoned.

The present invention relates to a novel monoazo disperse dye suitable for dyeing hydrophobic fibers, particularly polyester fibers and cellulose ester fibers, in a blue color.

For dyeing of hydrophobic fibers such as polyester fibers and cellulose ester fibers, anthraquinone disperse dyes are used in many cases, irrespective of their low molar absorption coefficient, for the reasons that they are superior in stability in a dye bath, that is, they are low in pH sensitivity and superior in decomposition resistance in a dye bath, and besides that they provide dyed goods of brilliance and high fastnesses. But the anthraquinone disperse dyes are generally of high cost, which is a commercially serious problem, and therefore a solution of this problem is strongly demanded in the related field.

While, azo disperse dyes are generally of low cost and have the advantages that their molar absorption coefficient is large and the fastnesses of dyed goods are high as compared with the anthraquinone disperse dyes, they have serious drawbacks in that they are poor in stability in a dye bath and provide dyed goods lacking brilliance. Various azo disperse dyes are disclosed, for example, in Japanese Patent Publication Nos. 6910/1966 (A) and 16554/1976 (B) and British Pat. No. 1,489,016 (C) as shown below:

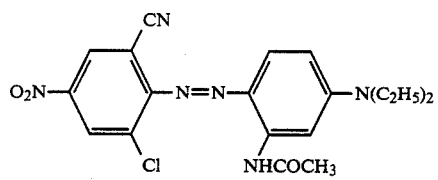
(A-1)

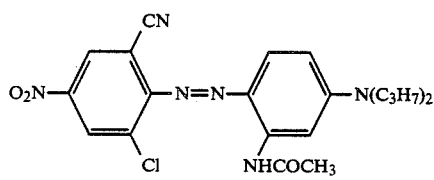
(A-2)

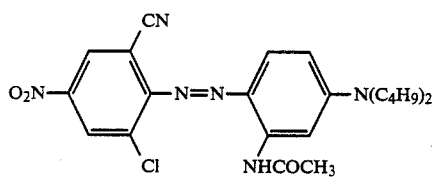
(A-3)

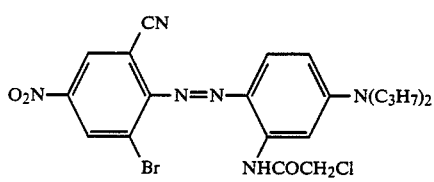
(A-4)

-continued

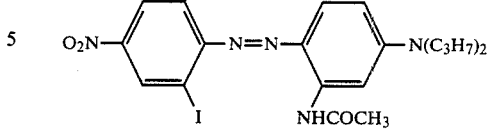
(B-1)

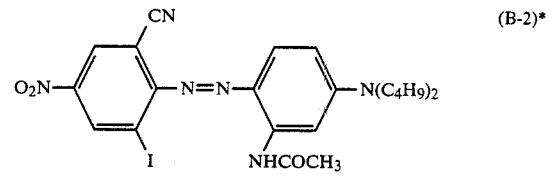
(B-2)*

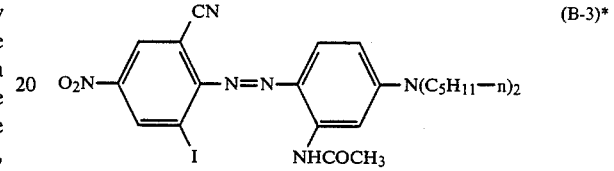
(B-3)*

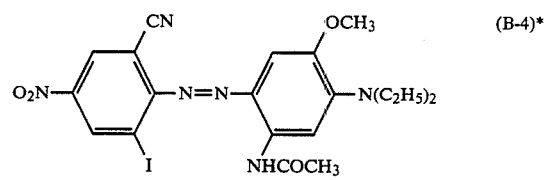
(B-4)*

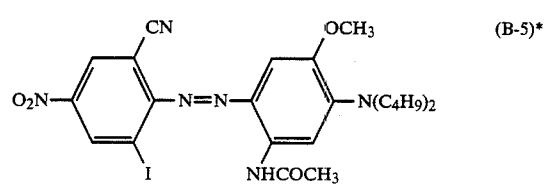
(B-5)*

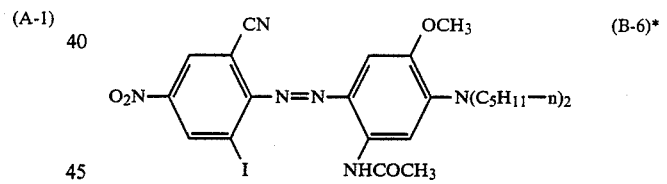
(B-6)*

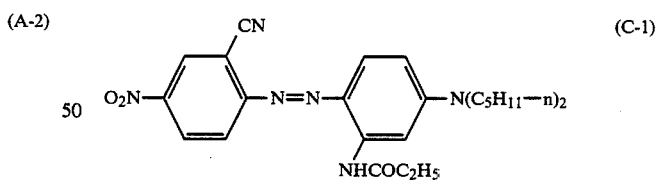
(C-1)

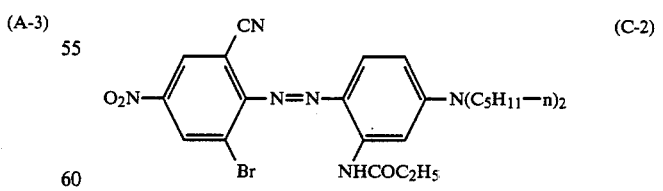
(C-2)

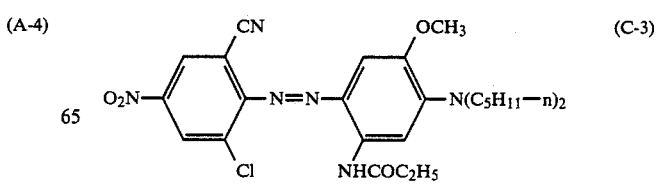
(C-3)

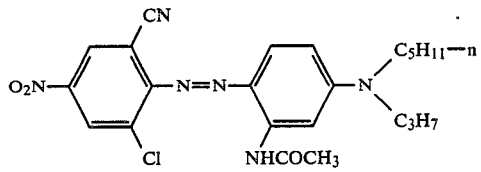

(C-4)

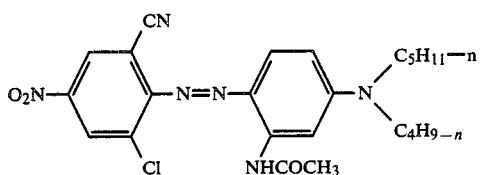

(C-5)

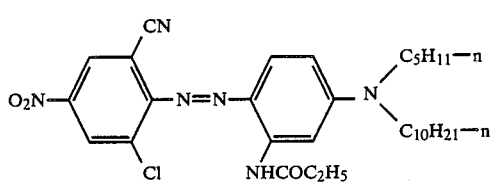

(C-6)

*This compound is not disclosed explicitly in Japanese Patent Publication No. 16554/1976 but included therein conceptually.

Further, the following commercial azo blue disperse dyes are known:

Known compound I:

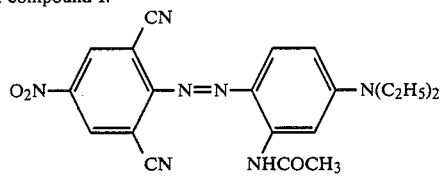

Known compound II:

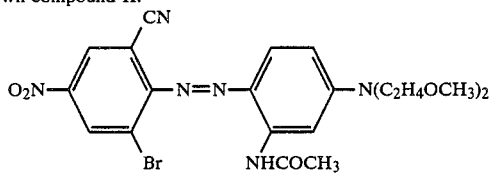

Known compound III:

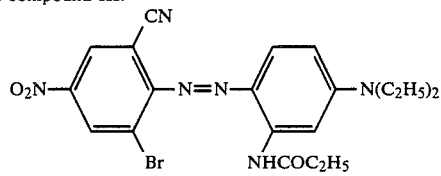

All the aforesaid azo disperse dyes, however, have the serious drawbacks as described above.

In order to overcome the drawback that anthraquinone disperse dyes are of high cost, the development of low-cost dyes by mixing anthraquinone disperse dyes and azo disperse dye has been tried in the related field. The fact is however that practical low-cost mixed dyes are not obtained with ease. In general, mixed dyes of anthraquinone dyes and azo dyes lose brillance characteristic of the anthraquinone dyes and only provide dyed goods with poor reproducibility because of the decomposition of azo dyes on dyeing.

In order to solve these problems, the inventors extensively studied to find azo blue disperse dyes of high commercial value.

An object of the present invention is to provide a novel azo blue disperse dye excellent in dyeing affinity, stability in a dye bath (low pH sensitivity and superior decomposition resistance), sublimation resistance and light fastness as well as brilliance and deep shade.

Another object of the present invention is to provide a novel azo blue disperse dye which can provide a mixed dye of high commercial value comprising said azo dye and an anthraquinone blue disperse dye without damaging the characteristics of the anthraquinone dye.

A further object of the present invention is to provide novel azo blue disperse dyes which achieve the aforesaid objects and besides have a stable, novel crystal form causing no lowering in dispersibility nor aggregation during dyeing.

These objects can be achieved by providing (1) a novel azo blue disperse dye of the formula (I),

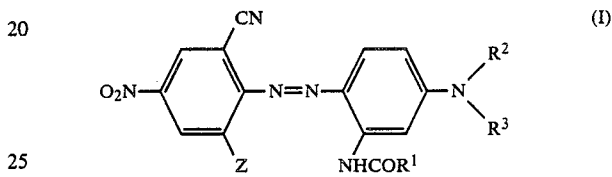

(I)

wherein $R^1$ is methyl or ethyl, $R^2$ and $R^3$ are each $C_5$ to $C_8$ alkyl and Z is chlorine or cyano, (2) a process for producing the dye of the formula (I), which comprises reacting a diazotized compound of the formula (II),

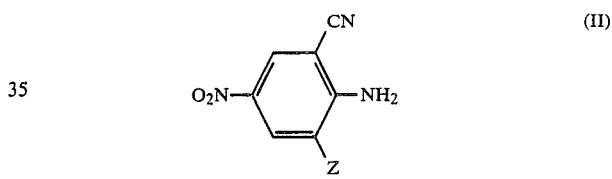

(II)

wherein Z is as defined above, with a compound of the formula (III),

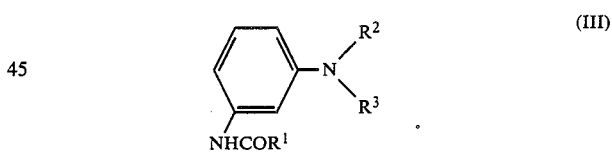

(III)

wherein $R^1$, $R^2$ and $R^3$ are as defined above, (3) 2-cyano-4-nitro-6-chloro-2'-acetylamino-4'-(N,N-di-n-pentyl)amino-1,1'-azobenzene of a crystal form showing a great relative intensity at each angle of an X-ray powder diffraction (2θ; Cu—Kα) of 14.0°, 18.5°, 21.4° and 25.6°, and a medium relative intensity at the angle of 11.2°, 12.6°, 16.0°, 17.6°, 19.2°, 23.5°, 24.2° and 26.4°, and (4) a process for producing the monoazo compound of the above particular crystal form, which comprises reacting diazotized 2-cyano-4-nitro-6-chloroaniline with 3-acetylamino-N,N-di-n-pentylaniline, to obtain a monoazo compound, 2-cyano-4-nitro-6-chloro-2'-acetylamino-4'-(N,N-di-n-pentyl)amino-1,1'-azobenzene, and then heating the resulting monoazo compound in an aqueous medium or an organic solvent, if necessary, in the presence of a surfactant.

In the formula (I), the alkyl represented by $R^2$ and $R^3$ is $C_5$ to $C_8$ straight alkyl, preferably $C_5$ or $C_6$ straight alkyl. Of the compounds of the formula (I), preferred ones are dyes wherein both of $R^2$ and $R^3$ are n-pentyl or n-hexyl, preferably n-pentyl, and Z is chlorine. The most preferred ones are dyes represented by the formula,

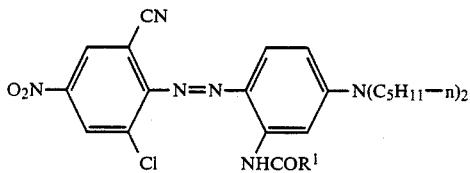

wherein $R^1$ is as defined above, preferably methyl.

In producing the compound of the formula (I), the compound of the formula (II) include

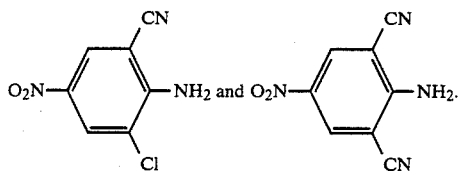

Specific examples of the compound of the formula (III) include the following compounds:

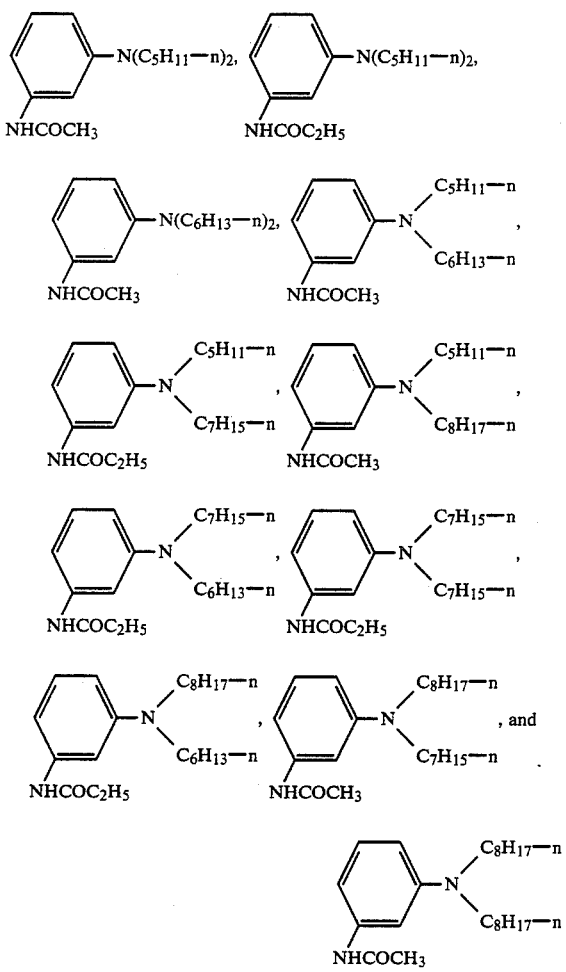

These compounds (III) are obtained by dialkylating 3-acetylaminoaniline or 3-propionylaminoaniline with a corresponding alkyl halide or a corresponding alkyl ester of p-toluenesulfonic acid according to known methods, for example the method disclosed in Japanese Patent Publication No. 3712/1966.

The dyes of the formula (I) are obtained as follows: The compound of the formula (II) (diazo component) is diazotized, as it is or after being dissolved or suspended in a mineral acid (e.g. sulfuric acid, hydrochloric acid) or organic acid (e.g. acetic acid, propionic acid), with nitrosylsulfuric acid at a low temperature, preferably at about 10° to about 15° C. for about 5 hours; the compound of the formula (III) (coupling component) is dissolved in a mineral acid (e.g. hydrochloric acid, sulfuric acid), organic acid (e.g. acetic acid, propionic acid) or organic solvent (e.g. methanol, ethanol); the diazo component obtained above is added thereto preferably at a temperature of about 10° C. or less, and the mixture is allowed to react at the same temperature for about 5 to about 10 hours to complete coupling, and after the reaction is finished, the deposited product is filtered, washed with water and dried.

The dye (I) thus obtained can be finely pulverized together with a suitable dispersing agent in an aqueous medium according to methods well known to those skilled in the art, and applied, in a paste form or a powder form after spray-drying, to the dyeing of the foregoing hydrophobic fibers.

In producing 2-cyano-4-nitro-6-chloro-2'-acetylamino-4'-(N,N-di-n-pentyl)amino-1,1'-azobenzene (referred to as "monoazo compound" for brevity hereinafter) of the particular crystal form, the wet cake or dry cake of the monoazo compound produced from the corresponding diazo component (2-cyano-4-nitro-6-chloroaniline) and the corresponding coupling component (3-acetylamino-N,N-di-n-pentylaniline) according to the above method, is heat-treated in an aqueous medium or organic solvent (e.g. alcohols, acetic acid) in the presence of a surfactant (e.g. a dispersing agent) if necessary.

As to the amount of the aqueous medium or organic solvent used in the heat treatment, amounts larger than that required to dip the monoazo compound completely are necessary. Generally, however, amounts larger than about ten times the weight of the monoazo compound are preferably used, because thorough stirring is desirable for avoiding non-uniform heating.

In carrying out the heat treatment, a dispersing agent (e.g. naphthalenesulfonic acid/formalin condensates, naphtholsulfonic acid/cresol/formalin condensates) or an anionic or nonionic surfactant may be present in the system in an amount of 1 to 400% by weight based on the weight of the monoazo compound, whereby desirable effects such as a rise in the dispersibility of the dye can be expected.

The heat-treatment temperature is preferably within a range of 80° to 100° C. at atmospheric pressure. When the temperature is lower than 80° C., the effect can not be expected, or, if it can be expected, the heat treatment requires a very long period of time. While, the treatment may also be carried out at a temperature higher than 100° C., such temperature is not desirable operationally because pressure vessels are required.

The heat-treatment time somewhat varies depending on the temperature, the amount of aqueous medium or organic solvent and the kinds and amounts of other additives, but generally, about 1 to about 5 hours are sufficient.

The thus obtained monoazo compound having the particular X-ray powder diffraction is finely pulverized together with a suitable dispersing agent (e.g. naphthalenesulfonic acid/formalin condensates) in an aqueous medium in a manner known to those skilled in the art and used for dyeing the aforesaid hydrophobic fibers in a paste form or a powder form obtained by spray drying or the like.

The dye (I) of the present invention is suitable for dyeing hydrophobic fibers, particularly polyester fibers and cellulose ester fibers, in a brilliant blue color by methods well known to those skilled in the art. For example, hydrophobic fibers are dyed by dipping them in an aqueous medium containing the dye (I) and treating at 105° C. or higher, preferably 110° to 140° C. under increased pressure. The fibers may also be dyed at a relatively high temperature, for example at the boiling point of water, in the presence of a carrier such as o-phenylphenol or trichlorobenzene.

Further, the so-called thermosol method may also be applied, that is, hydrophobic fiber cloth may be dyed by padding the cloth with a dye disperse liquor followed by dry-heat treatment at 150° to 230° C. for 30 to 60 seconds.

Still further, the dye (I) of the present invention may effectively be applied to printing methods which comprise printing the cloth with a color paste produced from a dye (I)-containing dispersion and a suitable thickening agent, followed by steaming or thermosol treatment. Also, the dye (I) may be applied to solvent dyeing methods using an organic solvent (e.g. trichloroethylene, perchloroethylene) as a dyeing medium.

Further, by using the monoazo compound of the particular crystal form, all the troubles in dyeing, for example lowering in dispersibility and formation of aggregates, are eliminated, and brilliant, deep and uniform dyed goods can be obtained.

The present invention will be illustrated in more detail with reference to the following examples and comparative examples, which are not however to be interpreted as limiting the invention thereto. All parts and percents in the examples are by weight.

Figure 2:
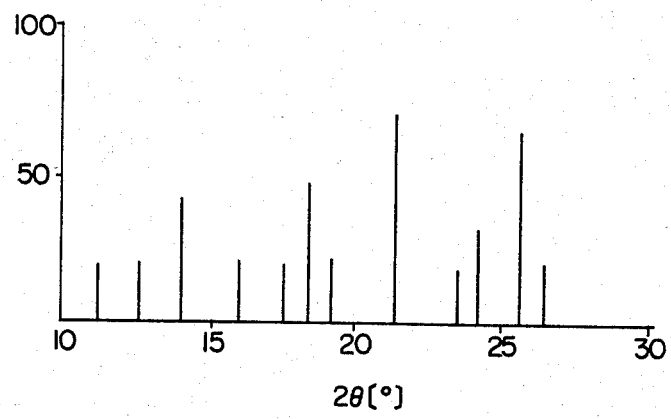

Referring to the drawings, FIG. 1 and FIG. 2 are schematic diagrams of the X-ray powder diffraction, respectively of the monoazo compound not heat-treated after the coupling, and that having the particular crystal form by the heat-treatment of the present invention. That is, FIG. 1 and FIG. 2 schematically show the graph of diffraction by irradiation of Cu—K$_\alpha$ ray, the graph being recorded by a self-recording machine equipped with a Geiger counter. The abscissa indicates the diffraction angle ($2\theta$; Cu—K$_\alpha$) and the ordinate the relative intensity (R.I.) of diffracted ray. FIG. 3 shows the decomposition percentage-exhaustion percentage characteristic of each dye. Preparation of dyes of the formula (I) and dyeing of hydrophobic fibers using the same:

EXAMPLE 1

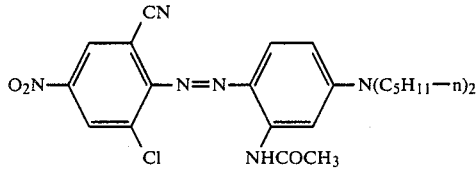
(1)

3-Acetylaminoaniline (15 parts) was reacted with n-amyl chloride (32 parts) at 120° to 130° C. for 4 hours in the presence of anhydrous sodium carbonate (21.2 parts) to obtain 3-acetylamino-N,N-di-n-pentylaniline (coupling component).

The resulting 3-acetylamino-N,N-di-n-pentylaniline was dissolved in methanol (200 parts). 2-cyano-4-nitro-6-chloroaniline (19.8 parts) was diazotized at a low temperature (10° C. or less) with nitrosylsulfuric acid, and the resulting diazo liquor was added dropwise to the above coupler liquor at 5° C. or less.

After coupling was finished, the deposited product was filtered, washed with water and dried to obtain 44.8 parts of a dye (1). Yield, 90% based on the diazo component.

The dye of the formula (1) (3 parts) was finely pulverized together with a naphthalene-β-sulfonic acid/formalin condensate (3 parts) and sodium lignosulfonate (1.5 parts) to change it to a dispersible form and uniformly dispersed in water (3000 parts) together with the sulfuric ester (3 parts) of a higher alcohol to prepare a dye bath.

Tetoron spun yarn (polyester fiber produced by Toray Co.) (100 parts) was dipped in the bath and dyed at 130° C. for 60 minutes. After dyeing, reduction clearing was applied to the dyed yarn at 85° C. for 10 minutes in a liquor comprising sodium hydroxide (3 parts), hydrosulfite (3 parts), a betaine type amphoteric surfactant (3 parts) and water (3000 parts).

Thereafter, the dyed yarn was rinsed and dried to obtain dyed goods of a deep, brilliant and fast royal blue.

EXAMPLE 2

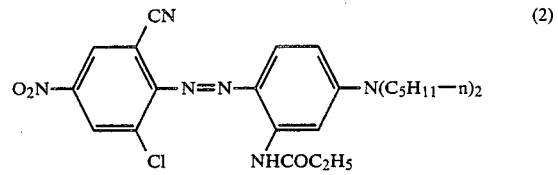
(2)

3-Propionylaminoaniline (16.4 parts) was reacted with n-amyl p-toluenesulfonate (58.1 parts) at 100° C. for 5 hours in a solvent comprising methyl cellosolve (100 parts) and water (100 parts) in the presence of anhydrous sodium carbonate (12.7 parts) to obtain 3-propionylamino-N,N-di-n-pentylaniline (coupling component).

In the same manner as in Example 1, 2-cyano-4-nitro-6-chloroaniline was diazotized and coupled with the above coupling component to obtain 45.1 parts of a dye (2).

Yield, 88% based on the diazo component.

After finely pulverizing the dye (2) (3 parts) together with a naphthalene-β-sulfonic acid/formalin condensate (3 parts) and sodium lignosulfonate (1.5 parts) to change it to a dispersible form, the preparation of a dye bath and dyeing were carried out in the same manner as in Example 1 to obtain dyed goods of a deep, brilliant and fast royal blue.

EXAMPLE 3

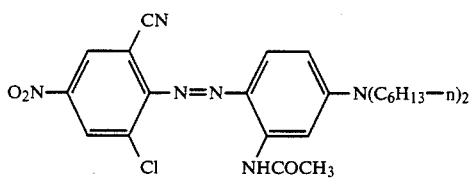

3-Acetylaminoaniline (15 parts) was reacted with n-hexyl chloride (36.2 parts) at 120° to 130° C. for 4 hours in the presence of anhydrous sodium carbonate (21.2 parts) to obtain 3-acetylamino-N,N-di-n-hexylaniline (coupling component).

The resulting 3-acetylamino-N,N-di-n-hexylaniline was dissolved in methanol (200 parts). 2-Cyano-4-nitro-6-chloroaniline (19.8 parts) was diazotized at a low temperature (10° C. or less) with nitrosylsulfuric acid, and the resulting diazo liquor was added dropwise to the above coupler liquor at 5° C. or less.

After coupling was finished, the deposited product was filtered, washed with water and dried to obtain 47.4 parts of a dye (3).

Yield, 90% based on the diazo component.

$\lambda_{max}$, 603 nm (in DMF).

m.p. 137°–139° C.

The dye of the formula (3) (3 parts) was finely pulverized together with a naphthalene-$\beta$-sulfonic acid/formalin condensate (3 parts) and sodium lignosulfonate (1.5 parts) to change it to a dispersible form and uniformly dispersed in water (3000 parts) together with the sulfuric ester (3 parts) of a higher alcohol to prepare a dye bath.

Tetoron spun yarn (polyester fiber produced by Toray Co.) (100 parts) was dipped in the bath and dyed at 130° C. for 60 minutes. After dyeing, reduction clearing was applied to the dyed yarn at 85° C. for 10 minutes in a liquor comprising sodium hydroxide (3 parts), hydrosulfite (3 parts), a betaine type amphoteric surfactant (3 parts) and water (3000 parts).

Thereafter, the dyed yarn was rinsed and dried to obtain dyed goods of a deep, brilliant and fast royal blue.

EXAMPLE 4

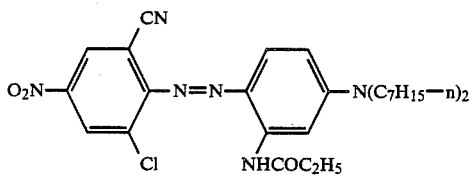

3-Propionylaminoaniline (16.4 parts) was reacted with n-heptyl p-toluenesulfonate (64.8 parts) at 100° C. for 5 hours in a solvent comprising methyl cellosolve (100 parts) and water (100 parts) in the presence of anhydrous sodium carbonate (12.7 parts) to obtain 3-propionylamino-N,N-di-n-heptylaniline (coupling component).

In the same manner as in Example 1, 2-cyano-4-nitro-6-chloroaniline was diazotized and coupled with the above coupling component to obtain 48.8 parts of a dye (4).

Yield, 88% based on the diazo component.

$\lambda_{max}$, 603 nm (in DMF)

After finely pulverizing the dye (4) (3 parts) together with a naphthalene-$\beta$-sulfonic acid/formalin condensate (3 parts) and sodium lignosulfonate (1.5 parts) to change it to a dispersible form, the preparation of a dye bath and dyeing were carried out in the same manner as in Example 3 to obtain dyed goods of a deep, brilliant and fast royal blue.

EXAMPLE 5

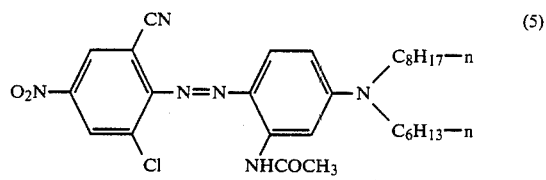

3-Acetylaminoaniline (15 parts) was reacted with n-octyl bromide (19.3 parts) at 90° to 100° C. for 4 hours in the presence of anhydrous potassium carbonate (6.9 parts) to obtain 3-acetylamino-N-octylaniline. Thereafter, reaction was further continued at 120° to 130° C. for 4 hours with addition of n-hexyl bromide (16.5 parts) and anhydrous potassium carbonate (6.9 parts) to obtain 3-acetylamino-N-n-octyl-N-n-hexylaniline (coupling component). In the same manner as in Example 1, 2-cyano-4-nitro-6-chloroaniline was diazotized and coupled with the above coupling component to obtain 45.9 parts of a dye (5).

Yield, 85% based on the diazo component.

$\lambda_{max}$, 604 rm (in DMF)

After finely pulverizing the dye (5) (3 parts) together with a naphthalene-$\beta$-sulfonic acid/formalin condensate (3 parts) and sodium lignosulfonate (1.5 parts) to change it to a dispersible form, the preparation of a dye bath and dyeing were carried out in the same manner as in Example 3 to obtain dyed goods of a deep, brilliant and fast royal blue.

EXAMPLE 6

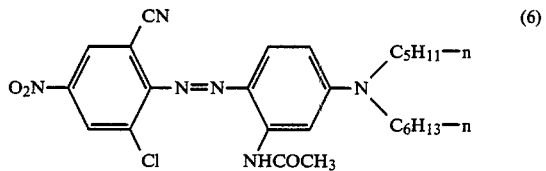

3-Acetylaminoaniline (15 parts) was reacted with n-hexyl chloride (12.1 parts) at 100° to 110° C. for 4 hours in the presence of anhydrous sodium carbonate (5.3 parts) to obtain 3-acetylamino-N-hexylaniline. Thereafter, reaction was further continued at 120° to 130° C. for 4 hours with addition of n-amyl chloride (10.7 parts) and anhydrous sodium carbonate (5.3 parts) to obtain 3-acetylamino-N-n-hexyl-N-n-pentylaniline (coupling component). In the same manner as in Example 1, 2-cyano-4-nitro-6-chloroaniline was diazotized and coupled with the above coupling component to obtain 42.5 parts of a dye (6).

Yield, 83% based on the diazo component.

$\lambda_{max}$, 603 nm (in DMF)

The dye of the formula (6) (3 parts) was finely pulverized together with a naphthalene-$\beta$-sulfonic acid/formalin condensate (3 parts) and sodium lignosulfonate (1.5 parts) to change it to a dispersible form and uniformly dispersed in water (3000 parts) together with the sulfuric ester (3 parts) of a higher alcohol to prepare a dye bath.

Tetoron spun yarn (polyester fiber produced by Toray Co.) (100 parts) was dipped in the bath and dyed at 130° C. for 60 minutes. After dyeing, reduction clearing was applied to the dyed yarn at 65° C. for 10 minutes in a liquor comprising sodium hydroxide (3 parts), hydrosulfite (3 parts), a betaine type amphoteric surfactant (3 parts) and water (3000 parts).

Thereafter, the dyed yarn was rinsed and dried to obtain dyed good of a deep, brilliant and fast royal blue.

EXAMPLE 7

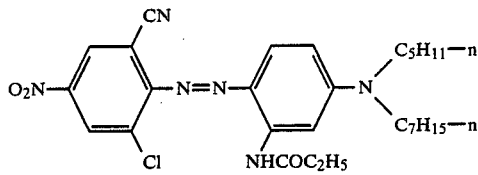

(7)

3-Propionylaminoaniline (16.4 parts) was reacted with n-heptyl p-toluenesulfonate (27 parts) at 100° C. for 4 hours in methyl cellosolve (200 parts) in the presence of anhydrous sodium carbonate (5.3 parts) to obtain 3-propionylamino-N-heptylaniline. Thereafter, reaction was further continued at 100° to 110° C. for 4 hours with addition of n-amyl p-toluenesulfonate (24.2 parts) and anhydrous sodium carbonate (5.3 parts) to obtain 3-propionylamino-N-n-heptyl-N-n-pentylaniline (coupling component). In the same manner as in Example 1, 2-cyano-4-nitro-6-chloroaniline was diazotized and coupled with the above coupling component to obtain 45.9 parts of a dye (7).

Yield, 85% based on the diazo component.

$\lambda_{max}$, 602 nm (in DMF)

After finely pulverizing the dye (7) (3 parts) together with a naphthalene-$\beta$-sulfonate acid/formalin condensate (3 parts) and sodium lignosulfonate (1.5 parts) to change it to a dispersible form, the preparation of a dye bath and dyeing were carried out in the same manner as in Example 1 to obtain dyed goods of a deep, brilliant and fast royal blue.

EXAMPLE 8

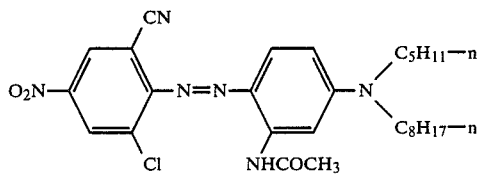

(8)

3-Acetylaminoaniline (15 parts) was reacted with n-octyl bromide (19.3 parts) at 100° C. for 4 hours in the presence of anhydrous sodium carbonate (5.3 parts) to obtain 3-acetylamino-N-n-octylaniline. Thereafter, reaction was further continued at 120° to 130° C. for 4 hours with addition of n-amyl bromide (15.1 parts) and anhydrous sodium carbonate (5.3 parts) to obtain 3-acetylamino-N-n-octyl-N-n-pentylaniline (coupling component). In the same manner as in Example 1, 2-cyano-4-nitro-6-chloroaniline was diazotized and coupled with the above coupling component to obtain 43.8 parts of a dye (8).

Yield, 81% based on the diazo component.

$\lambda_{max}$, 601 nm (in DMF)

After finely pulverizing the dye (8) (3 parts) together with a naphthalene-$\beta$-sulfonic acid/formalin condensate (3 parts) and sodium lignosulfonate (1.5 parts) to change it to a dispersible form, the preparation of a dye bath and dyeing were carried out in the same manner as in Example 1 to obtain dyed goods of a deep, brilliant and fast royal blue.

EXAMPLE 9

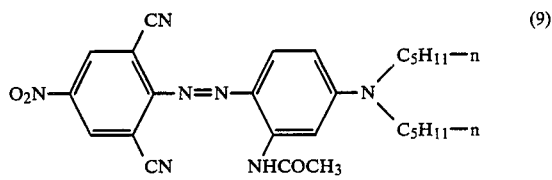

(9)

3-Acetylamino-N,N-di-n-pentylaniline was synthesized in the same manner as in Example 1, and this product (29.0 parts) was dissolved in methanol (200 parts) to obtain a coupler liquor. 2-Cyano-4-nitro-6-bromoaniline (24.2 parts) was diazotized at a low temperature (10° C. or less) with nitrosylsulfuric acid, and resulting diazo liquor was added dropwise to the above coupler liquor at 5° C. or less. After coupling was finished, the deposited product was filtered, washed with water and dried to obtain 48.9 parts of 2-cyano-4-nitro-6-bromo-2'-acetylamino-4'-(N,N-di-n-pentyl)amino-1,1'-azobenzene.

The whole amount of the resulting product was dissolved in DMF (250 parts), and cuprous cyanide (10 parts) was added thereto at room temperature over about 2 hours. Thereafter, stirring was continued at room temperature for 18 hours to complete the reaction. Insoluble inorganic substances produced were removed by filtration, and the filtrate was poured into methanol (1000 parts). The deposited crystals were filtered, washed with water and dried to obtain 40.0 parts of a dye (9).

Overall yield, 81.8%

$\lambda_{max}$, 647 nm (in DMF)

EXAMPLE 10

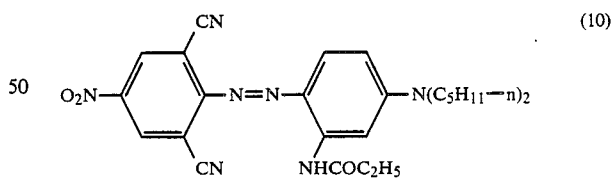

(10)

3-Propionylamino-N,N-di-n-pentylaniline was synthesized in the same manner as in Example 2, and this product (30.4 parts) was dissolved in methanol (200 parts) to obtain a coupler liquor. In the same manner as in Example 9, 2-cyano-4-nitro-6-bromoaniline was diazotized and coupled with the above coupler to obtain 2-cyano-4-nitro-6-bromo-2'-propionylamino-4'-(N,N-di-n-pentyl)amino-1,1'-azobenzene. The resulting product was dried and changed to a cyano compound with cuprous cyanide in the same manner as in Example 9 to obtain 40.2 parts of a dye (10).

Overall yield, 80%

$\lambda_{max}$, 645 nm (in DMF)

COMPARATIVE EXAMPLES

The decomposition resistance and dyeability of the present compounds were compared with those of the foregoing well-known dyes. The results are shown in Table 1.

TABLE 1

|  |  | Decomposition resistance (1) | Dyeability (2) |
|---|---|---|---|
| Present dyes | Example 1 | 18 | 96 |
|  | Example 2 | 20 | 93 |
|  | Example 3 | 17 | 95 |
|  | Example 4 | 15 | 91 |
|  | Example 5 | 14 | 90 |
|  | Example 6 | 19 | 96 |
|  | Example 7 | 18 | 95 |
|  | Example 8 | 16 | 91 |
|  | Example 9 | 28 | 91 |
|  | Example 10 | 30 | 93 |
| Comparative dyes | A - 1 | 92 | 97 |
|  | A - 2 | 86 | 96 |
|  | A - 3 | 78 | 95 |
|  | A - 4 | 65 | 85 |
|  | B - 1 | 56 | 72 |
|  | B - 2 | 20 | 15 |
|  | B - 3 | 10 | 10 or less |
|  | B - 4 | 75 | 90 |
|  | B - 5 | 20 | 10 or less |
|  | B - 6 | 10 | 10 or less |
|  | C - 1 | 63 | 95 |
|  | C - 2 | 18 | 37 |
|  | C - 3 | 57 | 80 |
|  | C - 4 | 70 | 94 |
|  | C - 5 | 60 | 93 |
|  | C - 6 | 10 | 15 |
|  | Well-known I | 95 | 98 |
|  | Well-known II | 97 | 99 |
|  | Well-known III | 89 | 96 |

Note (1) Decomposition resistance (decomposition percentage)

$$\text{Decomposition percentage (\%)} = 100 \times \left(1 - \frac{\text{Weight of a dye in a dye bath after treatment}}{\text{Weight of a dye used}}\right)$$

Treatment conditions: 140° C. × 30 minutes, pH 7
Composition of dye bath:
- Dye conc. cake — 3 parts
- Naphthalene-β-sulfonic acid type dispersing agent — 3 parts
- Lignosulfonic acid type dispersing agent — 1.5 parts
- Sulfuric ester of higher alcohol — 3 parts
- Water — 3000 parts Decomposition percentage is a numerical illustration of pH sensitivity, and smaller values are desirable because they mean less decompostion.

Note (2) Dyeability (exhaustion percentage)

$$\text{Exhaustion percentage (\%)} = 100 \times \left(1 - \frac{\text{Weight of a dye in a residual bath after dyeing}}{\text{Weight of a dye used}}\right)$$

Dyeing conditions: 130° C. × 60 minutes, pH 5
Composition of dye bath:
- Dye conc. cake — 3 parts
- Naphthalene-β-sulfonic acid type dispersing agent — 3 parts
- Lignosulfonic acid type dispersing agent — 1.5 parts
- Sulfuric ester of higher alcohol — 3 parts
- Water — 3000 parts FIG. 3 is a diagram obtained by plotting the data in Table 1 with decomposition percentage as ordinate and exhaustion percentage as abscissa. Dyes having a smaller decomposition percentage and a larger exhaustion percentage, that is, those present in the top right-hand region in FIG. 3 have a practical value. The dyes alone of the present invention are present in the top right-hand region, which means that they have an excellent practical value.

Preparation of the dye having the particular crystal form and dyeing of hydrophobic fibers using the same:

EXAMPLE 11

2-Cyano-4-nitro-6-chloroaniline (19.8 parts) was diazotized with nitrosylsulfuric acid to obtain a diazo liquor. 3-Acetylamino-N,N-di-n-pentylaniline (29 parts) was dissolved in methanol (150 parts), and the above diazo liquor was added thereto at 0° to 5° C. to carry out coupling while adding ice to the methanol solution. After reaction was finished, the deposited product was filtered, and washed with water to obtain 150 parts of 2-cyano-4-nitro-6-chloro-2'-acetylamino-4'-(N,N-di-n-pentyl)amino-1,1'-azobenzene wet cake (corresponding to 43.8 parts converted to a dry basis). The X-ray powder diffraction of this product is schematically shown in FIG. 1.

This wet cake (150 parts) was suspended in water (1500 parts) and heat-treated at 95° C. for 3 hours with stirring. After cooling, the cake was filtered and washed with water to obtain 135 parts of a dye wet cake (corresponding to 43.8 parts converted to a dry basis). The X-ray powder diffraction of the dye is schematically shown in FIG. 2.

2-Cyano-4-nitro-6-chloro-2'-acetylamino-4'-(N,N-di-n-pentyl)amino-1,1'-azobenzene having the above particular crystal form (3 parts) was finely pulverized together with a naphthalene-β-sulfonic acid/formalin condensate (3 parts) and sodium lignosulfonate (1.5 parts) to change it to a dispersible form, and uniformly dispersed in water (3000 parts) together with the sulfuric ester (3 parts) of a higher alcohol to prepare a dye bath.

Tetoron spun yarn (polyester fiber produced by Toray Co.) (100 parts) was dipped in the bath and dyed at 130° C. for 60 minutes. After dyeing, reduction clearing was applied to the dyed yarn at 65° C. for 10 minutes in a liquor comprising sodium hydroxide (3 parts), hydrosulfite (3 parts), a betaine type amphoteric surfactant (3 parts) and water (3000 parts). Thereafter, the dyed yarn was rinsed and dried to obtain dyed goods of a deep, brilliant and fast royal blue.

This dyed product was uniform in depth and showed no specks owing to dye aggregation at all.

EXAMPLE 12

2-Cyano-4-nitro-6-chloro-2'-acetylamino-4'-(N,N-di-n-pentyl)amino-1,1'-azobenzene wet cake (150 parts; corresponding to 43.9 parts converted to a dry basis) obtained by diazotization and coupling in the same manner as in Example 11, was suspended in water (1500 parts), and acetic acid (100 parts) was added thereto, followed by heat treatment at 90° C. for 3 hours with stirring. After cooling, the product was filtered and washed with water to obtain 140 parts of a dye wet cake (corresponding to 43.5 parts converted to a dry basis). The X-ray powder diffraction of the dye was the same as that in FIG. 2.

Dyeing was carried out in the same manner as in Example 11 using the dye thus obtained. As a result, the same good dyeing results as in Example 11 were obtained.

EXAMPLE 13

2-Cyano-4-nitro-6-chloro-2'-acetylamino-4'-(N,N-di-n-pentyl)amino-1,1'-azobenzene wet cake (150 parts; corresponding to 43.9 parts converted to a dry basis) obtained by diazotization and coupling in the same manner as in Example 11, was suspended in water (1500 parts), and a naphthalenesulfonic acid/formalin condensate (50 parts) was added thereto, followed by heat treatment at 90° C. for 2 hours with stirring. After cooling, the product was filtered and washed with water to obtain 136 parts of a dye wet cake (corresponding to 43.6 parts converted to a dry basis). The X-ray powder diffraction of the dye was the same as that in FIG. 2.

Dyeing was carried out in the same manner as in Example 11 using the dye thus obtained. As a result, the same good dyeing results as in Example 11 were obtained.

What is claimed is:

1. A compound of the formula,

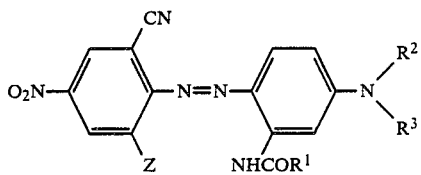

wherein $R^1$ is methyl or ethyl, and $R^2$ and $R^3$ are each straight $C_5$— or $C_6$—alkyl, and Z is chlorine.

2. The compound according to claim 1, wherein the compound is 2-cyano-4-nitro-6-chloro-2'-acetylamino-4'-(N,N-di-n-pentyl)amino-1,1'-azobenzene of a crystal form showing a great relative intensity at each angle of an X-ray powder diffraction (2θ; Cu—K$_α$) of 14.0°, 18.5°, 21.4° and 25.6°, and a medium relative intensity at the angle of 11.2°, 12.6°, 16.0°, 17.6°, 19.2°, 23.5°, 24.2° and 26.4°.

* * * * *